United States Patent
Mello

(10) Patent No.: US 7,526,079 B2
(45) Date of Patent: Apr. 28, 2009

(54) SYSTEM AND METHOD FOR DATA ATTACHMENT IN LIVE CALL TRANSFERS

(75) Inventor: David E. Mello, Casa Grande, AZ (US)

(73) Assignee: Inter-Tel, Inc, Tempe, AZ (US)

( * ) Notice: Subject to any disclaimer, the term of this patent is extended or adjusted under 35 U.S.C. 154(b) by 402 days.

(21) Appl. No.: 11/019,434

(22) Filed: Dec. 21, 2004

(65) Prior Publication Data

US 2006/0146998 A1    Jul. 6, 2006

(51) Int. Cl.
H04M 3/42    (2006.01)

(52) U.S. Cl. .............................. 379/212.01; 379/266.01

(58) Field of Classification Search ............ 379/142.01, 379/212.01, 214.01, 265.02, 265.01, 266.01
See application file for complete search history.

(56) References Cited

U.S. PATENT DOCUMENTS

| | | | | |
|---|---|---|---|---|
| 5,757,904 A | * | 5/1998 | Anderson | 379/265.06 |
| 5,915,010 A | * | 6/1999 | McCalmont | 379/212.01 |
| 5,937,051 A | * | 8/1999 | Hurd et al. | 379/212.01 |
| 6,256,381 B1 | * | 7/2001 | Donaghue, Jr. | 379/265.01 |
| 6,438,216 B1 | * | 8/2002 | Aktas | 379/88.01 |
| 6,668,244 B1 | * | 12/2003 | Rourke et al. | 704/275 |
| 6,687,241 B1 | | 2/2004 | Goss | |
| 6,853,710 B2 | * | 2/2005 | Harris | 379/142.01 |
| 7,043,009 B1 | * | 5/2006 | Fischer et al. | 379/265.09 |
| 7,181,492 B2 | * | 2/2007 | Wen et al. | 709/204 |
| 2002/0067821 A1 | * | 6/2002 | Benson et al. | 379/265.02 |
| 2002/0161896 A1 | * | 10/2002 | Wen et al. | 709/227 |
| 2004/0013243 A1 | | 1/2004 | Harris | |
| 2006/0067507 A1 | * | 3/2006 | Erhart et al. | 379/265.12 |
| 2006/0109974 A1 | * | 5/2006 | Paden et al. | 379/265.02 |

* cited by examiner

*Primary Examiner*—Olisa Anwah
(74) *Attorney, Agent, or Firm*—Michelle Whittington, Esq

(57) ABSTRACT

A system and method for data attachment to live call transfers allows the call recipient to attach data to a call, unbeknownst to the caller, and transfer the call and the data to a second recipient. Attached data can be subsequently retrieved, viewed, modified or deleted by the second recipient. The attached data remains with the call as it transferred about a businesses communication system for display at recipient endpoints.

17 Claims, 4 Drawing Sheets

SYSTEM AND METHOD FOR DATA ATTACHMENT IN LIVE CALL TRANSFERS

FIELD OF INVENTION

The present invention relates generally to a system and method for data attachment in live call transfers and specifically, to a system and method for annotations, information and appendages to be transmitted to a call recipient with the transferred call.

BACKGROUND OF THE INVENTION

PBX (private branch exchange) systems often provide a call recipient some form of caller ID to identify where the call is coming from. Predetermined message displays appear on the recipient's communication device, such as "202-444-1215 TRNSF from Bill Smith." This example identifies to the recipient where the call originated from as well as the person who was last handling the call. Typically, if Bill Smith wants to provide the recipient with additional information, for example about the caller or the reason for the call, Bill must delay the actual transfer to the recipient and communicate verbally or electronically with the recipient prior to transferring the call. Bill then transfers the call to the recipient and the caller ID information displays on the recipient's device simultaneously with the ring. Thus, a mechanism is needed to permit annotations, information and appendages to be transmitted to a call recipient simultaneously with the associated transferred call.

PBX systems with associated CTI (computer telephony interface) applications often use screen-pops to display the transferred call information on the recipient's computer workstation at the same time the call is transferred to the recipient. This technique also allows software applications to access databases to lookup additional information regarding the call, the caller and/or the caller's account. However, this feature often requires a database lookup each time the call is transferred; thereby adding complexity and cost to the overall system. Thus, it would be desirable to enhance the CTI functionality already being used so that annotations, information and appendages can be transmitted to a call recipient simultaneously with the transferred call. Additionally, it would be desirable to allow multiple users to view, append and edit data as the call is transferred from recipient to recipient.

BRIEF DESCRIPTION OF THE DRAWINGS

These and other features, aspects, and advantages may be best understood by reference to the following description taken in conjunction with the accompanying drawings, wherein like reference numerals indicate similar elements.

DETAILED DESCRIPTION

In general, a system and method for data attachment in live call transfers allows an application to attach data to a transferred call. The data can subsequently be retrieved, viewed, modified, or deleted by other applications as part of the call handling. Additionally, the present system and method allows an application to directly send an event to another application. A call recipient can input data to append to the live call, such as notes about the call, caller or purpose of the call. Unbeknownst to the caller, the data is transferred simultaneously or substantially simultaneously to a subsequent recipient at the same time the call is transferred.

In a typical PBX-type system, the name and number of the caller is provided on an endpoint display. The name and number may be provided by network caller ID, look-up tables and other methods well known in the telecommunications industry. As the call is transferred from endpoint to endpoint, the name and number are preserved to give future recipients identification information on the caller. The various embodiments of systems and methods for data attachment in live call transfers builds on the concept of retaining the name and number with the transferred call and permits the transferring party to append additional information about the call to be displayed on the recipient's endpoint display. In this manner, as the call is transferred from endpoint to endpoint, each of the recipients are able to add and modify customized messages as well as append additional data to displayable information associated with the transferred call.

A more detailed description of the exemplary systems and methods for data attachment in live call transfers in accordance with the invention will follow, to include a preferred embodiment and best mode.

Figure 1:
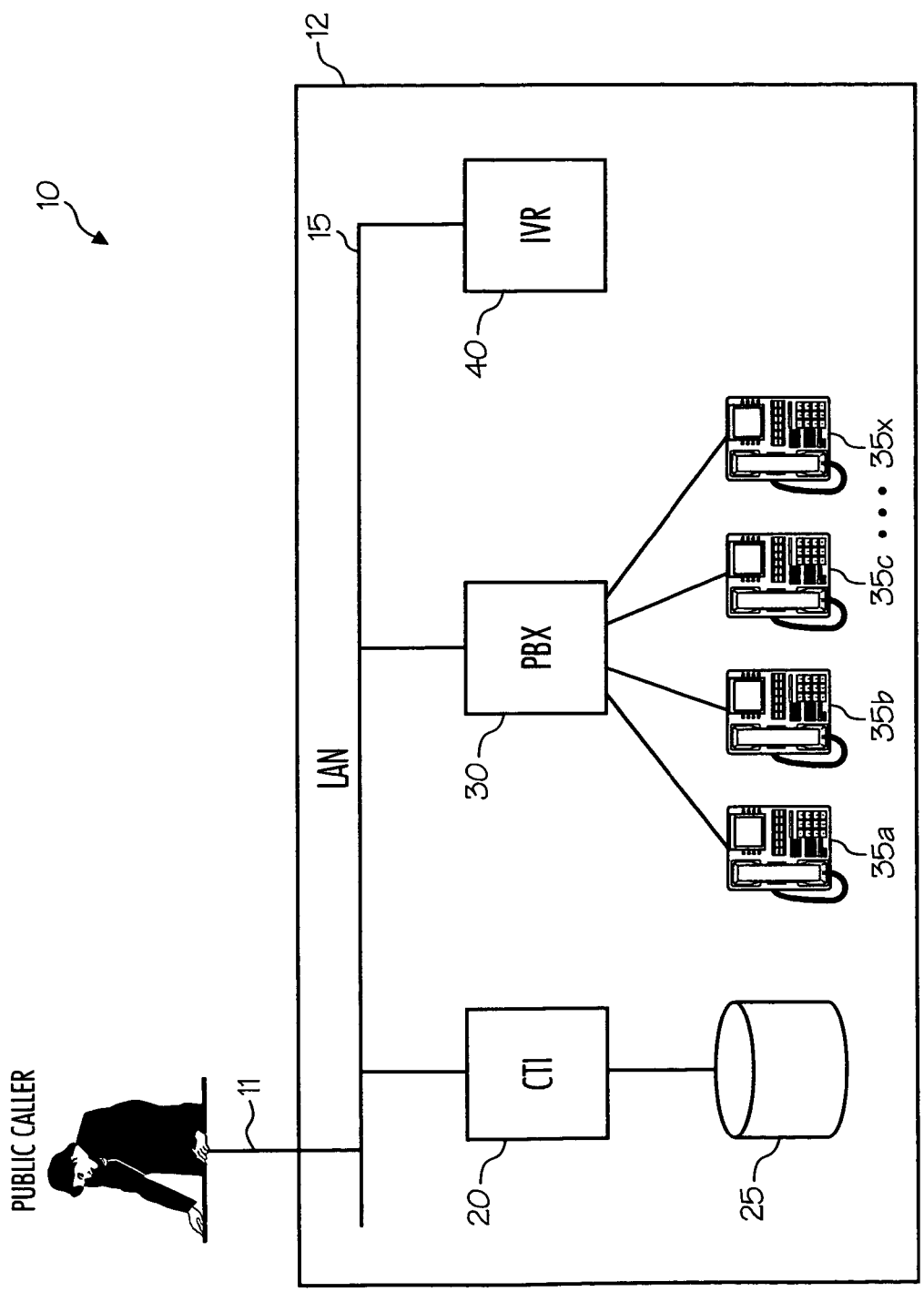
FIG. 1 illustrates an exemplary architecture which may support a data attachment system in live call transfers in accordance with the various embodiments.

FIG. 1 illustrates an exemplary architecture 10 which may support a data attachment system in live call transfers in accordance with the various embodiments. Exemplary architecture or system 10 generally includes a business 12 having a variety of communications equipment such as CTI 20, PBX 30 and IVR 40 coupled by an internal network or LAN 15. It should be realized that business 12 may include any type of office-setting, architecture or environment and may include one or more physical locations preferably with inter-communication networks. "Business," as it is used herein, is for convenience purposes only and not intended to be limiting in any way. Network or LAN 15 may be LAN, Ethernet, wired and wireless solutions, or any other communication medium suitable for routing data, information, video and/or voice between the various components of business 12. Of course, it should be appreciated that LAN 15, or the equivalent, may be used for routing various other data, and the like, within the network and may facilitate communication among other components not shown in FIG. 1 or discussed herein.

CTI 20 (computer telephony interface) includes any hardware and/or software processing system to interact and assist PBX 30. For example, CTI 20 may have various software programs and applications stored thereon configured to assist in the routing of telephone calls, provide information to the call recipient (e.g., screen-pops), assist in controlling the operation of the telephone system, and monitor events for system 10. CTI 20 further includes access to one or more memory units 25 for storage of call-related information. The general structure and/or functional aspects of CTI technology is well known in the communications industry, and therefore will not be discussed in detail. However, particular features of the CTI as they pertain to the data attachment system will be discussed below.

PBX 30 (private branch exchange) includes any suitable PBX or switching system that facilitates communication with an external processing system and serves one or more endpoints 35. PBX systems, and the like, are generally well known and provide telephone and message services as needed to endpoints and users. Provided services typically focus on the delivery of external and internal calls to a business. In general, PBXs are telephone exchanges having special functions directed towards business users including, but not limited to, integrated voice mail, hands free intercom calls, call center functions, complex system networks, and additional features using external computer control. Modern PBXs may include hardware, software and hardware, hybrid or purely software switching systems.

Figure 3A:
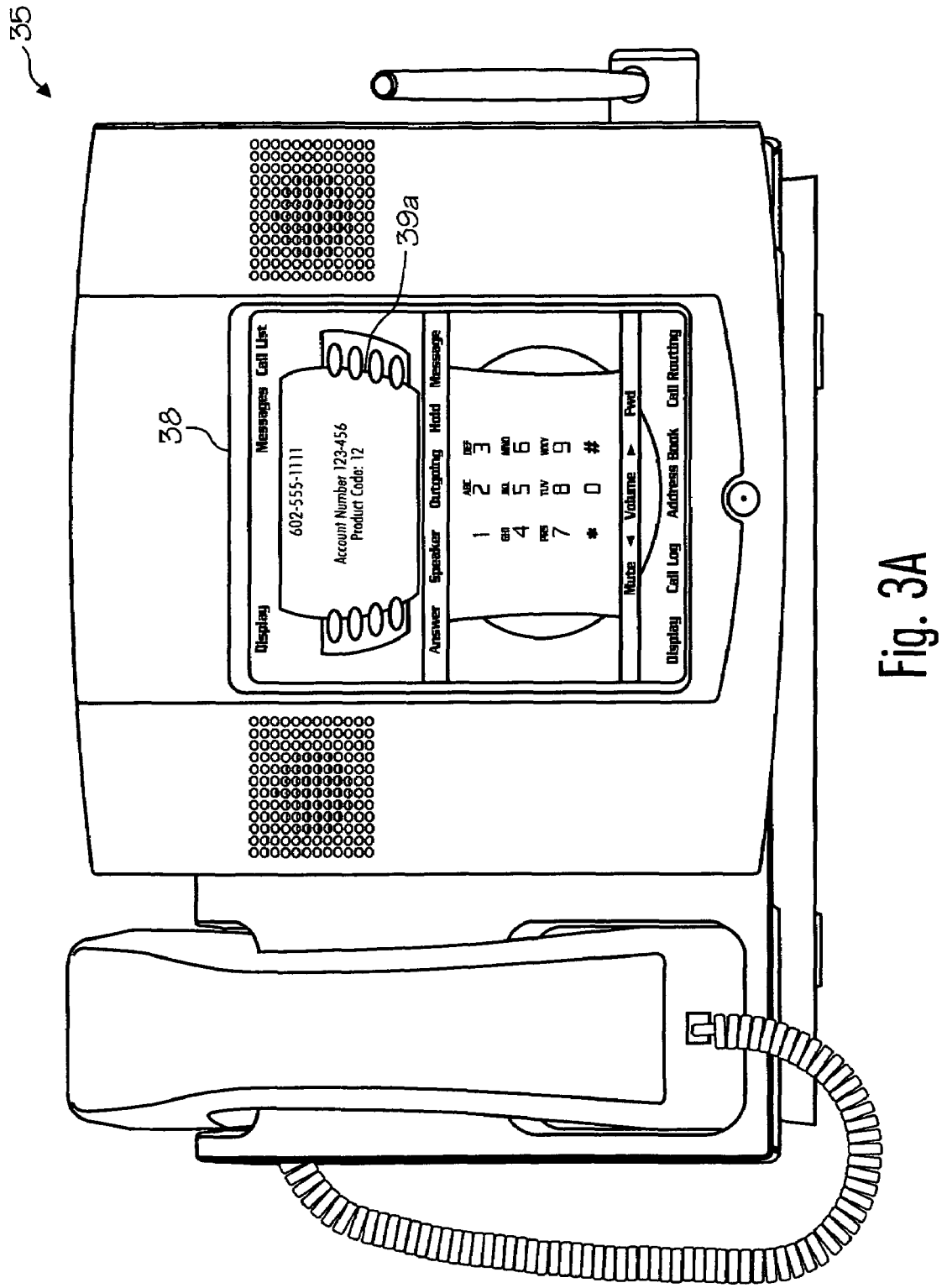
FIGS. 3A-3C illustrate exemplary endpoints and endpoint displays depicting data attached to a live call transfer in accordance with the various embodiments.

Endpoints 35 include any suitable communication device having a display and input means. Suitable endpoints include, but not limited to, a desktop keyset, a computing device, telephones (stationary and portable), personal digital assistants, pagers, wireless remote clients, messaging devices, and any other communication device capable of transmitting and receiving communication signals. In one particular embodiment, endpoint 35 is a multimedia endpoint, for example, the Inter-Tel® Model 8690™ endpoint, as illustrated in FIG. 3A.

IVR 40 (interactive voice response) is another well known system in the communications industry. In general, IVRs provide an automated response system for callers to input or speak requested information, via keypad, microphone or the like. For example, calls to business 12 may be received at IVR 40 and the caller may be prompted with various menu options to assist the system in directing the caller to the correct department or endpoint. In one particular embodiment, IVR 40 may request the caller to input their account number. The system recognizes either the input or spoken numbers and associates them with the call. The number received by the IVR is then attached to the call by sending a command to CTI 20 to associate the number data to a call identification and store the data, e.g. memory 25.

As illustrated on FIG. 1, business 12 communicates bi-directionally with public callers over network 11. Network 11 may comprise any means of information communication, such as PSTN, the Internet, WAN, cellular stations and other wireless means, and any other suitable network for providing information communication between callers and business 12.

The following flowchart is provided to better understand the various steps of operation of a data attachment in live call transfer system as described herein. It should be realized that the following description is not intended to be limiting but rather to provide a description of various embodiments and a best mode of operation. It should be appreciated that additional steps may occur that are not represented on the following flowchart but are discussed in the conjoining text or elsewhere herein. Moreover, there may be operations, functions, routines, and the like that are not depicted on the flow or elsewhere but are well understood in the industry as common actions for a communications system. Unless specifically stated, the order of the depicted and described operations is not limited to the description.

Figure 2:
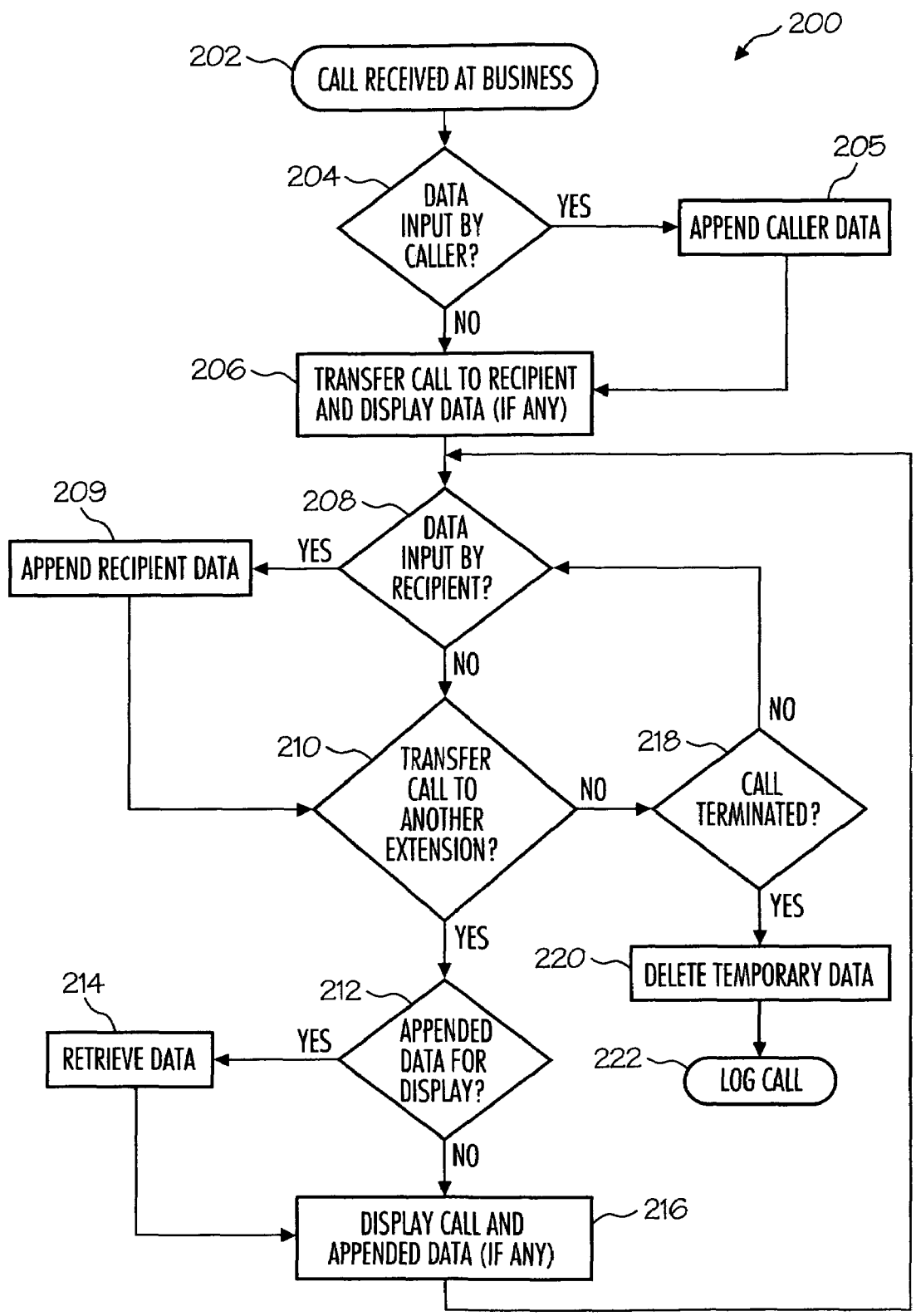
FIG. 2 is a flowchart of exemplary operations in a data attachment system.

FIG. 2 is a flowchart 200 of exemplary operations in a data attachment system and in particular, data attachment in live call transfer system. For ease of discussion, the following operational steps will be described for a particular business's customer service department. Additionally, the described steps and associated figures are with respect to a caller requesting technical assistance. It should be realized that the inventive disclosure has usefulness in a variety of business environments and the following example is not intended to limit the scope of the disclosure in any way.

Initially, a call is received at the business, e.g., business 12 (step 202). It should be realized that the systems and methods of data attachment in live call transfers does not require an outside caller as the initiating source of the call. Rather, the various embodiments are equally applicable to calls initiated from within the business to a public recipient or to an internal recipient. For the sake of the present example only, it is assumed that the caller is calling the business experiencing a computer-related problem and is calling the business for technical assistance. In one particular embodiment, the business's telecommunication system is configured to receive the call at an IVR system of the business. The IVR system prompts the caller to identify the purpose of the call or provide details about the caller, for example by keying in a numerical digit corresponding to "technical assistance" or keying in the caller's account number. In the optional IVR system, the system may query whether the caller input data per the IVR prompt (step 204). If there is data input by the caller, then the system appends the data to the call (step 205). In one particular embodiment, the data is attached to the call by sending a command to a CTI application to associate the data to a particular call ID (not the same caller ID provided by the network) or "tag", and store the data in the CTI application associated memory.

The call is then transferred to the endpoint device of the appropriate recipient along with the caller data for display (step 206). FIG. 3A illustrates an exemplary endpoint device 35 having a display panel 38 suitable for use in a data attachment system for live call transfers. Endpoint device 35 is merely one example of a suitable device and is provided for illustrative purposes only and not intended to be limiting. Panel 38 includes a display 39a and a softkey input means comprising a virtual telephone keypad. Exemplary display 39a illustrates what the recipient may view on the coupled endpoint. The caller's telephone number appears along with the caller's account number and product code. The latter two may have been the result of the caller's data input and represent the appended caller data. The recipient then answers the call and attempts to assist the caller in resolving the technical problem.

According to the various embodiments of the data attachment system, the recipient is able to input messages or notes regarding the conversation with the caller. The recipient may simply select a function (softkey or hard key) from the endpoint, key-in a series of preprogrammed characters or select a feature from an associated personal computer to alert the system that the recipient desires to append data. There are various other techniques to alert the system of the desire to append data that will work equally as well. In one embodiment, the recipient may use the stylus of a multimedia endpoint, like endpoint 35 of FIG. 3A, to input the notes. In another embodiment, the recipient uses a standard keyboard and personal computer which may be coupled to an endpoint or the personal computer may be the endpoint. In yet another embodiment, the recipient may simply speak the notes into a microphone or handset and speech recognition software in the endpoint translates the speech into viewable words.

In one particular embodiment, the system queries whether there is data input by the recipient to be associated with the call, or alternatively, queries whether there is any appended data associated with the call (step 208). The system may look for tags associated with the call. The tags are assigned, for example in the CTI, at the time data is attached (step 209). There are various methods by which an application can determine the tag associated with the call. For instance, CTI applications of the same family may hard code a tag to a set value, tags may be sent directly from application to application, and the application may query for all the tags associated with a call and determine which tags it wants to use. The tagged information may be stored in a suitable memory accessible by the CTI, such as memory 25.

Assuming now that the complexity of the problem requires the call to be transferred to another recipient, such as a supervisor, the recipient performs a transfer function and transfers the call (step 210). For the sake of the present example, the supervisor is extension 2000. As part of the call delivery processing, the OAI application interacting with extension 2000 determines whether the call has data associated to it (step 212). In one embodiment, the transferring application may send a notice to the recipient application that a call is going to be transferred and the call has appended data. The receiving application retrieves the appended data (step 214). The data may be stored in a memory, such as memory 25, and can be retrieved using the tag associated with the data. The supervisor's endpoint receives the transferred call and all appended data is displayed at substantially the same time (step 216).

Figure 3B:
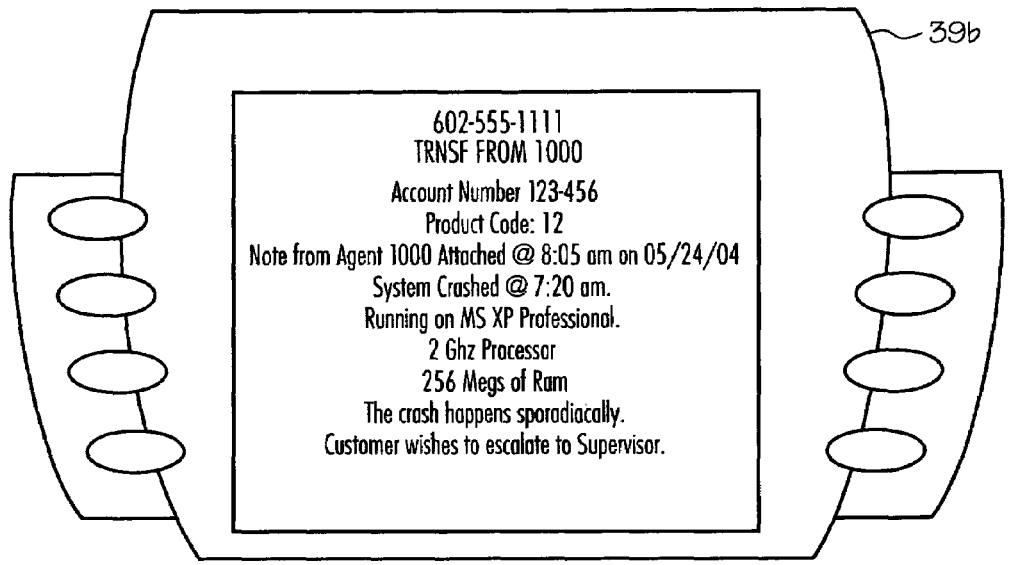

FIG. 3B illustrates an exemplary endpoint display 39b that may appear on the supervisor's endpoint device. Unless edited by the recipient, the information that was displayed to the recipient at extension 1000 will appear on subsequent displays, such as the device display of extension 2000. It should be realized that as the call travels from extension to extension, each of the recipients may have the ability to edit, modify, delete and alter the received data. This is especially useful if incorrect data is input along the way, and not realized until the next recipient views it. In other embodiments, the ability to edit received data may depend upon the level of the viewer, e.g., agent, supervisor, manager, etc. As illustrated on FIG. 3B, the displayed data may indicate the time, date and from whom the notes were attached. Additionally, the display provides several lines of data input by the previous agent 1000 to explain the nature of call or the caller or anything else the recipient wishes to document.

With continued reference to FIGS. 2 and 3B, the supervisor views the display and continues to discuss the problem with the caller. Perhaps at some point during the discussions, the supervisor decides to open a trouble ticket in the business's problem tracking system and appends the ticket to the call (step 208). Assume for the sake of this present example, that the ticket is an application available on another system. In accordance with the various embodiments of the data attachment system and methods, as the live call travels about the communication system of the business, data can be appended that causes a separate application to launch, such as a trouble ticket, and may be accessed by the recipient by clicking on a link. It should also be realized that various other forms of data may be attached such as graphics, video clips, formulas, rules and the like. The supervisor may decide to add additional notes to the call (step 209) and to transfer the caller and all the appended data to another extension, e.g., an engineer.

Figure 3C:
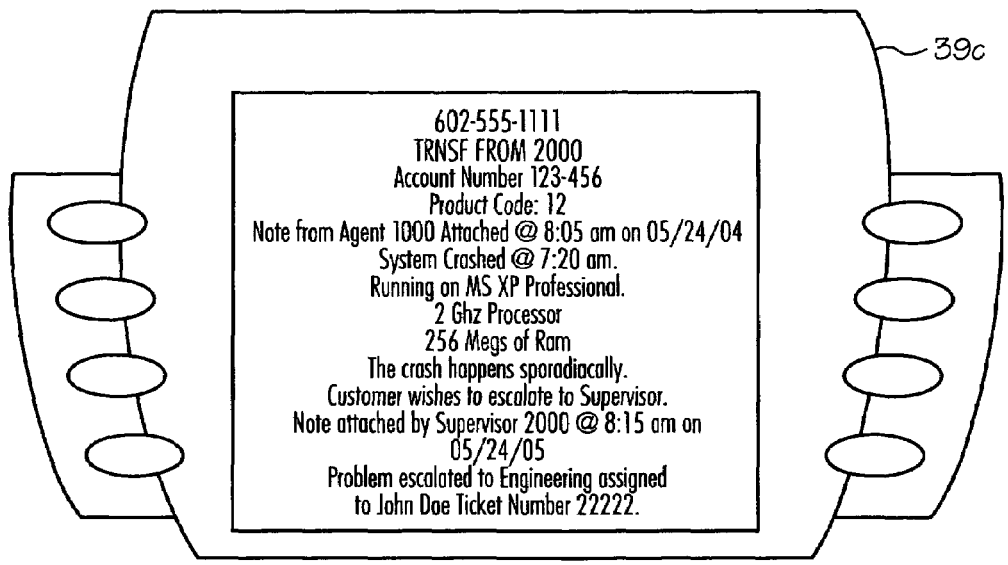

In a similar manner as the transfer from extension 1000 to extension 2000, the supervisor at extension 2000 transfers the call to another extension. For the sake of the present example, the supervisor transfers the call to an engineer at extension 3000 (step 210). The OAI application interacting with extension 3000 detects that there are items of attached data associated with the transferred call (step 212). The items are retrieved (step 214) and displayed on the endpoint device of extension 3000 (step 216). FIG. 3C illustrates an exemplary endpoint display 39c that may appear on the engineer's endpoint device. Similar to the previous transfer(s), all appended data appears on the display to include the most recent notes added by the supervisor. Additionally, the trouble ticket (identified on display 39c as "Ticket Number 22222") is appended and may be opened by subsequent recipients. The engineer views the display and may launch the appended application(s) in an attempt to resolve the caller's problem. This may be by a command (i.e., point and click) that instructs the attached application to open on an associated endpoint display. The engineer may continue to input notes pertaining to the caller and the problem and append the notes as previously described, or may refer to the attached trouble ticket and input data directly thereon.

At some point in time the call will terminate by disconnecting the communication line with the caller (step 218). The data associated with the call may have been in a temporary memory in the CTI while the call was live. At termination, the temporary data may be deleted to free memory space (step 220). However, data that was saved for permanent storage, such as the trouble ticket, remains on the system memory after the call is terminated. In one particular embodiment, a call log is maintained to keep a record of each live call (step 222). The log may include the flow pattern of the transferred call as it traveled from extension to extension. The log may further include a snapshot of one or more of the displays at any given time during the life of the call.

In one embodiment, a monitoring feature of the data attachment system displays a summary of all live calls having data attached. For example, supervisor or diagnostic personnel may be interested in obtaining the number of live calls, how many of the calls have data attached, and how much data is on each call at any given time. This information may be summarized and available for viewing at selected endpoints or by entering a password.

In yet another embodiment, applications (or endpoints) register with the CTI to receive application data events. In this manner, only those applications that are currently registered will receive data appended to a transferred call. Monitoring screens may be viewed to supervise which applications are currently registered for intra-application data.

Various other monitoring and supervisory functions may be available and are within the scope of the disclosed system. For instance, summary reports may list the number of calls having attached data, the maximum and average number of data attachment on a call, byte size for the attachments and various other information that may be useful for monitoring and supervisory personnel.

Presented herein are numerous systems, methods and techniques for data attachment in live call transfers, including the best mode. Having read this disclosure, one skilled in the industry may contemplate other similar techniques, modifications of structure, arrangements, proportions, elements, materials, and components that fall within the scope of the present invention. For example, instead of storing appended data in the CTI while the call is live, data may be stored in the PBX if memory capabilities are available. Also, various examples have been described herein to facilitate understanding of the data attachment in live call transfers system and operations. For instance, the flow chart of FIG. 2 presumes a caller initiated communication with the business; the scope of the invention is not so limiting. Rather, the data attachment in live call transfers is equally available to calls initiating within the business to public callers or internal callers and the starting point of the call is somewhat irrelevant. These and other changes or modifications are intended to be included within the scope of the disclosure, as expressed in the following claims.

The invention claimed is:

1. A method for data attachment to a live call transfer, the method comprising:

engaging in a live call at a first endpoint device;

appending an informational data to the live call by user input, the data capable of display at a second endpoint device;

transferring the live call and the informational data from the first endpoint to the second endpoint via a single communication pathway;

displaying the informational data at the second endpoint at substantially the same lime as the live call arrives at the second endpoint;

engaging in the live call at the second endpoint;

displaying, at a monitoring station, a content of the informational data appended to the live call; and repeating the above steps for additional endpoints until the call is terminated, whereby all the appended informational data from each endpoint is capable of display at subsequent endpoints.

2. The method of claim 1, further comprising receiving the live call at the first endpoint.

3. The method of claim 1, wherein the informational data comprises text.

4. The method of claim 1, wherein the informational data comprises one of graphics, video clips, formulas and rules.

5. The method of claim 1, further comprising:

storing the informational data in a memory; and retrieving the data from the memory for display at the second endpoint.

6. The method of claim 5, further comprising assigning a tag to the informational data and retrieving the data using the tag.

7. The method of claim 3, wherein the displayed informational text comprises a message input by a user at the first endpoint device.

8. The method of claim 1, further comprising logging a record of the live call.

9. A communication system for transferring a live call, the system comprising:

a switching system configured to route communications between a plurality of endpoints of the communication system;

a computer telephony system configured to assist the switching system during the routing of communications and to cause a stored data to appear on a display of the endpoint;

a network coupled to and facilitating the communication between the switching system and the computer telephony system;

a live call routed from the switching system to a user of a first endpoint device and during the live call, the user inputs an informational data to append to the live call unbeknownst to a caller and transfers the live call to a second endpoint device; and a monitoring station wherein a content of the informational data appended to the live call is displayed, wherein, the switching system transfers the live call and the appended informational data via a single communication pathway to the second endpoint device and the informational data is displayed on the second endpoint device at substantially the same time as the live call arrives, and wherein, a user of the second endpoint device during the live call inputs additional informational data to append to the live call unbeknownst to the caller and transfers the live call to a third endpoint device where all the informational data is displayed on the third endpoint device at substantially the same time as the live call arrives.

10. The communication system of claim 9, wherein the user inputs informational data by selecting characters on a keypad of the endpoint device.

11. The communication system of claim 9, wherein the informational data is a link that when selected causes a separate application to launch.

12. The communication system of claim 9, wherein the informational data comprises one of graphics, video clips, formulas and rules.

13. The communication system of claim 9 further comprising a call log comprising a record of live call activity which may be retrieved after the live call terminates.

14. A communication system for a live call transfer comprising:

a switching system configured to route communications between a plurality of endpoints of the communication system;

a computer telephony system configured to assist the switching system during the routing of communications and to cause a stored data to appear on a display of the endpoint;

a network coupled to and facilitating the communication between the switching system and the computer telephony system;

a live call routed from the switching system to a user of a first endpoint device and during the live call, the user inputs an informational data to append to the live call unbeknownst to a caller and transfers the live call to a second endpoint device; and a monitoring station wherein a content of the informational data appended to the live call is displayed, wherein, the switching system transfers the live call and the appended informational data via a single communication pathway to the second endpoint device and the informational data is displayed on the second endpoint device at substantially the same time as the live call arrives, and wherein, a user of the second endpoint device during the live call edits the informational data and transfers the live call to a third endpoint device where the informational data is displayed on the third endpoint device at substantially the same time as the live call arrives.

15. The communication system of claim 14, wherein the user of the second endpoint deletes some or all of the informational data and inputs additional informational data.

16. The communication system of claim 9, wherein the user inputs informational data through speech that is translated to viewable words.

17. The method of claim 3, wherein the user inputs the message by one of speaking into the endpoint, selecting characters on the endpoint, and selecting characters on a keyboard.

* * * * *